Sept. 17, 1940.　　　M. E. LANGE　　　2,214,820
MACHINE TOOL
Filed March 19, 1938　　　5 Sheets-Sheet 1

INVENTOR.
Max E. Lange
BY
Kwis Hudson & Kent
ATTORNEYS

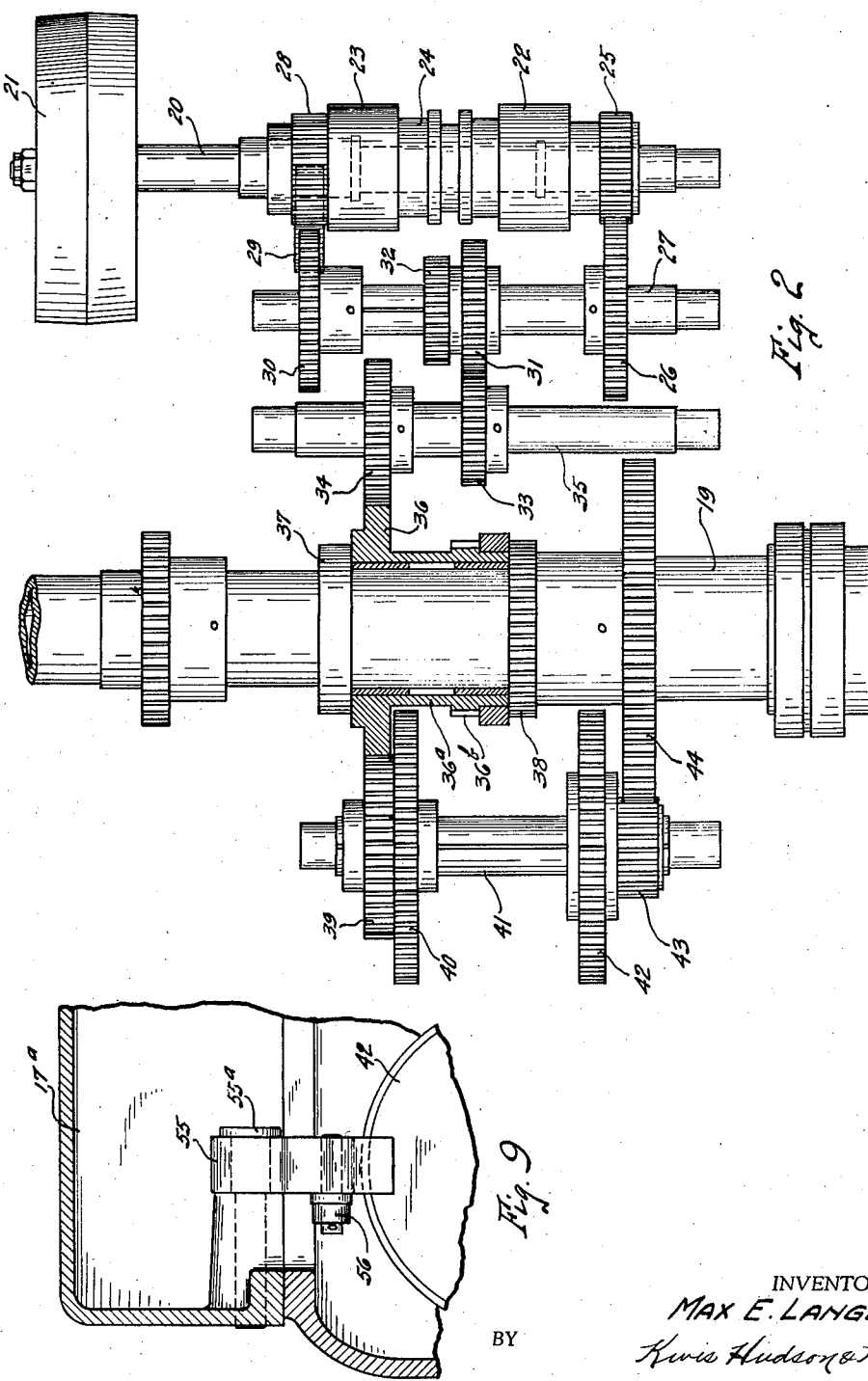

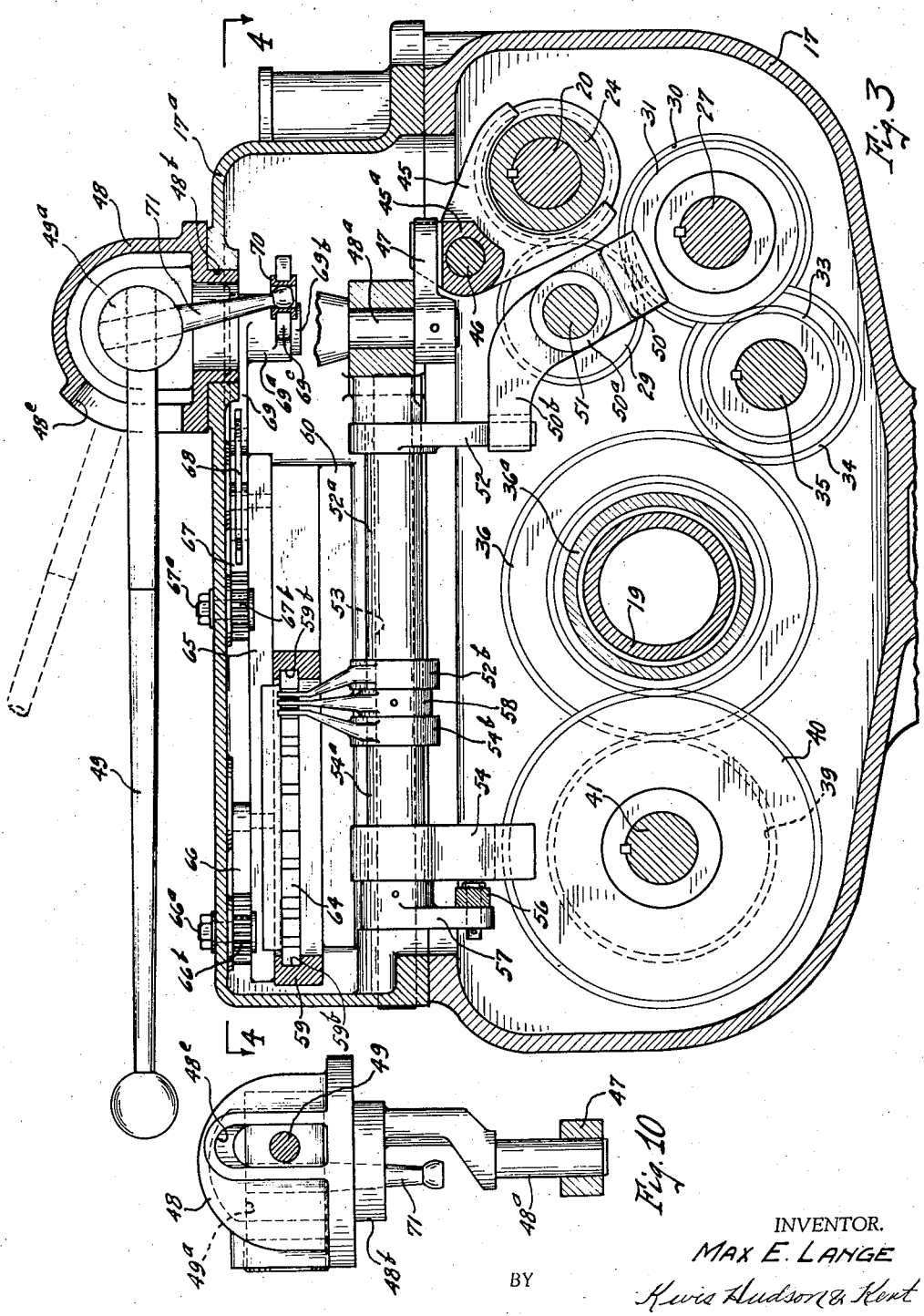

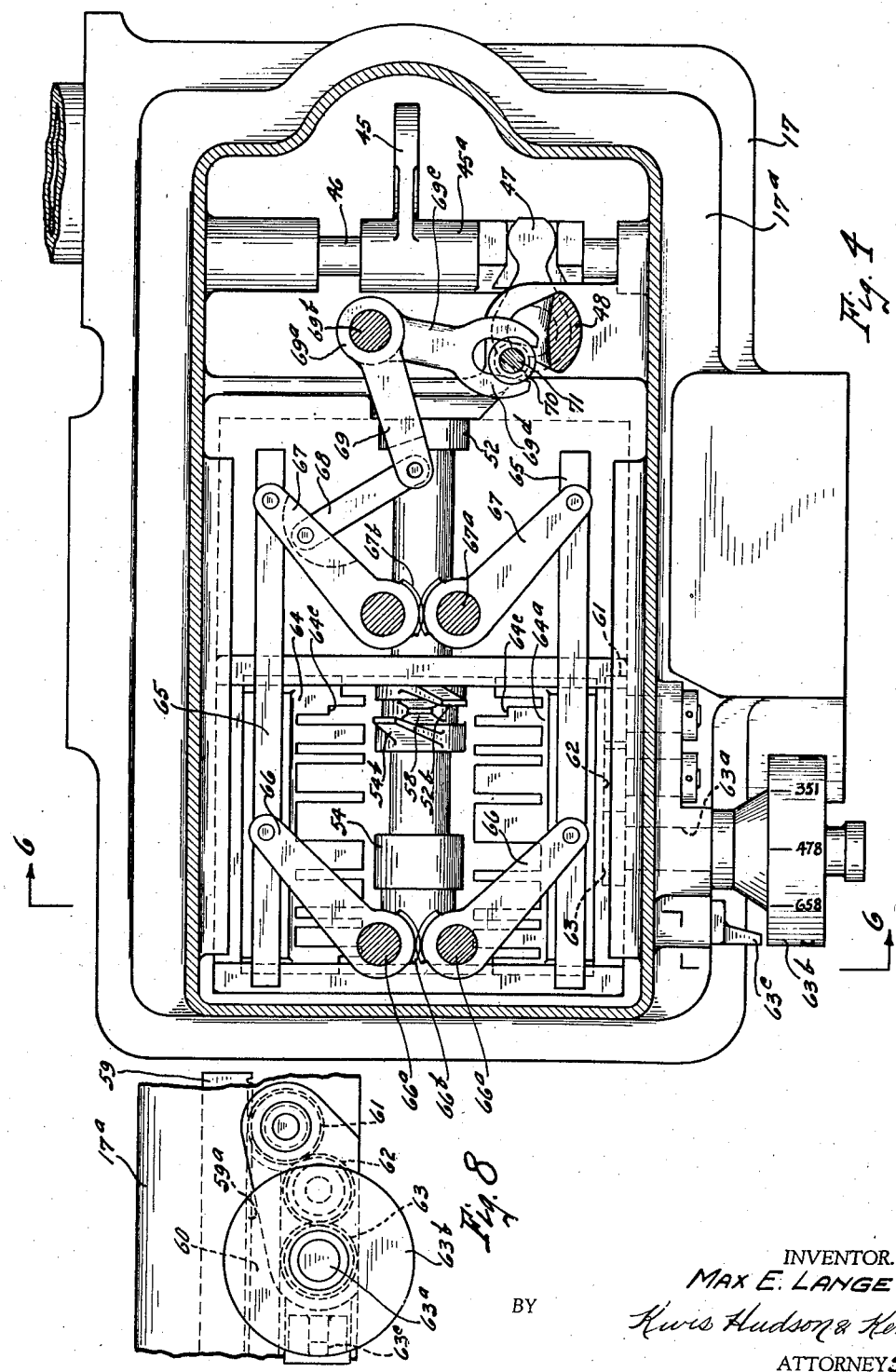

Sept. 17, 1940. M. E. LANGE 2,214,820
MACHINE TOOL
Filed March 19, 1938 5 Sheets—Sheet 5
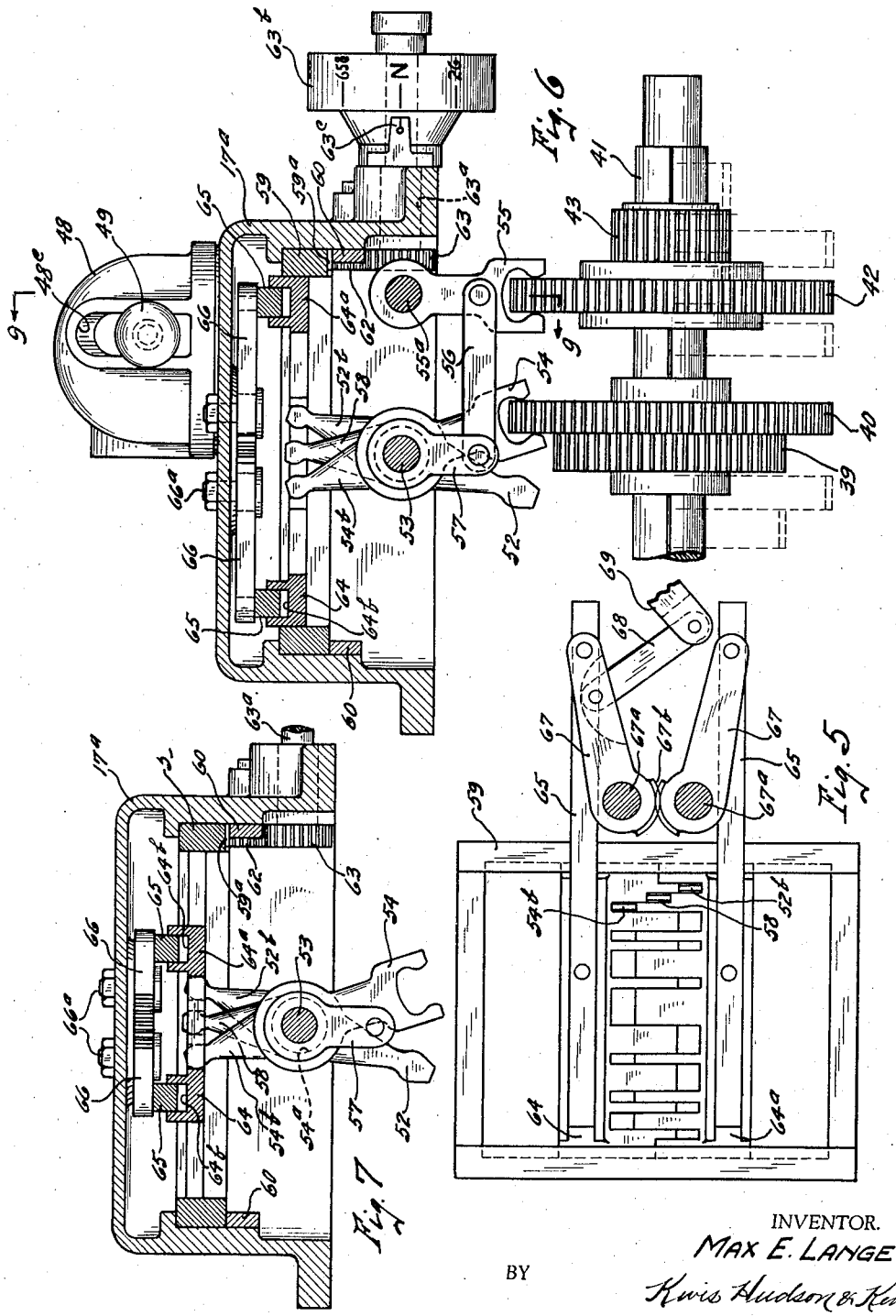
INVENTOR.
MAX E. LANGE
BY
Kwis Hudson & Kent
ATTORNEYS Patented Sept. 17, 1940

2,214,820

UNITED STATES PATENT OFFICE 2,214,820

MACHINE TOOL

Max E. Lange, Cleveland Heights, Ohio, assignor to The Warner & Swasey Company, Cleveland, Ohio, a corporation of Ohio Application March 19, 1938, Serial No. 196,952

19 Claims. (Cl. 82—29)

This invention relates to a machine tool and particularly to mechanism for selecting or preselecting the different rates of movement of a movable part of the machine as, for example, the rates of movement of the work spindle.

An object of the invention is to provide an improved mechanism for selecting or preselecting the rate of movement of a movable part of a machine tool.

Another object is to provide an improved mechanism for selecting or preselecting the rate of movement of a movable part of the machine tool and which mechanism is compact and particularly adapted to be employed in those locations of the machine tool wherein it is desirable to have the height of the machine as low as possible.

A further object is to provide a mechanism for selecting or preselecting the rate of movement of a movable part of a machine tool, and which mechanism is of the plate type and, therefore, though compact can be indexed over a wide area.

Further and additional objects and advantages not hereinbefore referred to will become apparent hereinafter during the detailed description of an embodiment of the invention which is to follow.

Referring to the accompanying drawings illustrating said embodiment of the invention, Fig. 1 is a front elevational view of a machine tool wherein the invention is embodied in the head stock and is employed to select or preselect the different speeds of the work spindle.

Fig. 2 is a developed view of the change speed gearing in the head stock and which drives the work spindle at varying rates of speed.

Fig. 3 is a fragmentary transverse sectional view through the machine and particularly the head stock thereof, and is taken substantially on line 3—3 of Fig. 1 looking in the direction of the arrows.

Fig. 4 is a horizontal sectional view through the head stock and is taken substantially on line 4—4 of Fig. 3 looking in the direction of the arrows.

Fig. 5 is a fragmentary view similar to the left hand portion of Fig. 4 but showing the parts thereof in a different position and with certain of the parts omitted.

Fig. 6 is a vertical sectional view through the head stock and is taken on the irregular line 6—6 of Fig. 4 looking in the direction of the arrows.

Fig. 7 is a fragmentary view of a portion of Fig. 6 and shows the parts in a different position.

Fig. 8 is a fragmentary end elevational view of the head stock and is taken looking from the right hand side of Fig. 6.

Fig. 9 is a fragmentary sectional view taken substantially on line 9—9 of Fig. 6 looking in the direction of the arrows, and Fig. 10 is a detached view taken from the front of the machine and shows the control lever in section and its associated parts in elevation.

Figure 1:
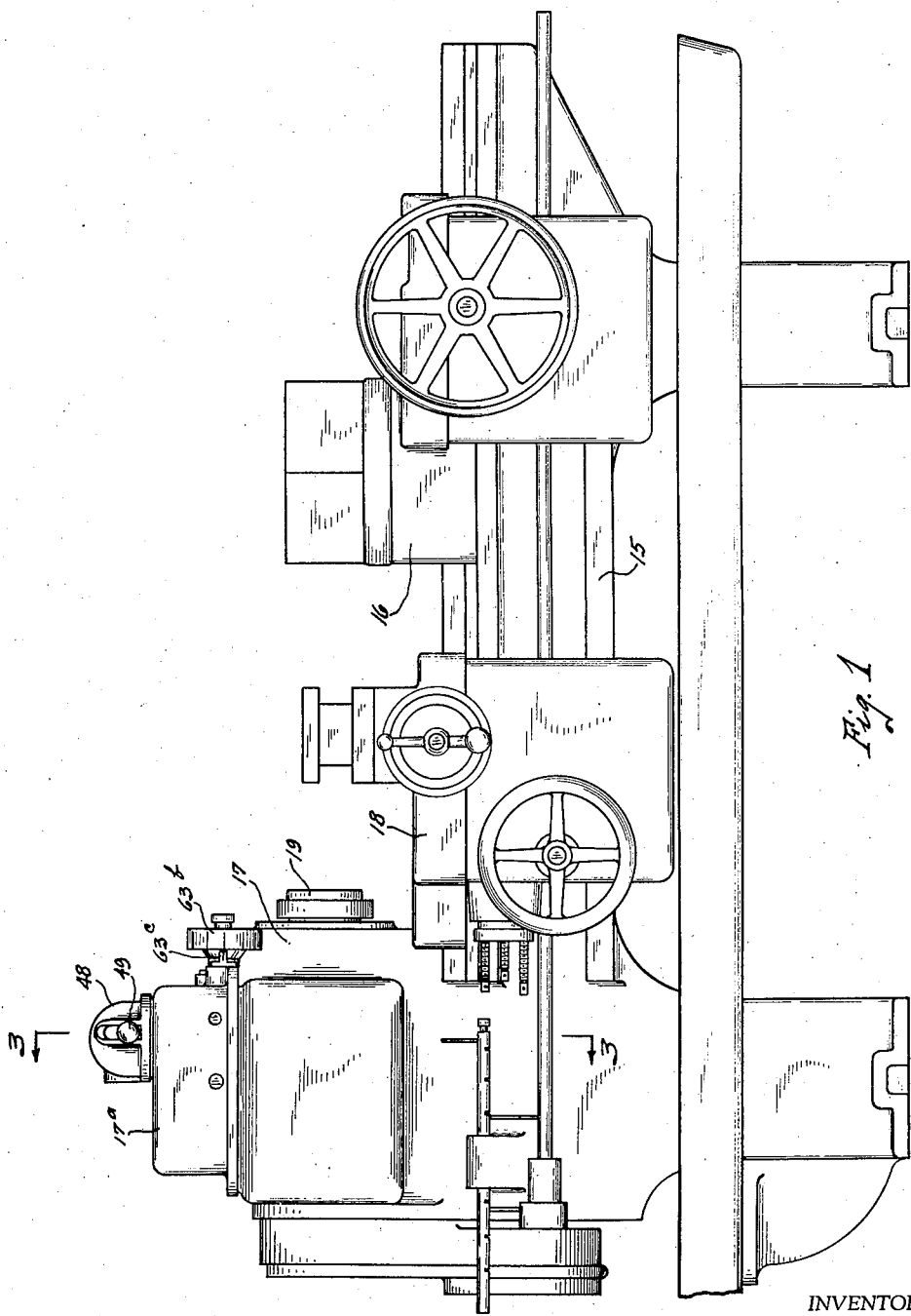

The machine tool shown herein by way of illustration is a turret lathe and comprises a bed 15 having thereon a turret slide 16 and intermediate said turret slide and the head stock 17 a cross slide carriage 18.

The selecting or preselecting mechanism of the present invention is utilized in this instance to select or preselect the different speeds of the work spindle 19 that is mounted in the head stock 17. It will be understood, however, that the selecting or preselecting mechanism might be employed in other relations to select or preselect the rate of movement of other movable parts of the machine tool such as the feeding mechanisms for the movable slides.

The work spindle 19 is rotatably mounted in the head stock 17 and is driven at variable speeds and in opposite directions by change speed gearing arranged in the head stock and which will now be described.

Referring to Fig. 2, the shaft 20 constitutes the main drive shaft and is, in this instance, provided with a pulley 21 fixed thereto and with clutch members 22 and 23 freely rotatable thereon. A shiftable clutch member 24 is mounted intermediate the clutch members 22 and 23 and is splined to the shaft 20 for rotation therewith and endwise movement thereon. The clutch member 22 has formed thereon a gear 25 that meshes with a gear 26 fixed to a rotatable shaft 27. The clutch member 23 is provided with a gear 28 that meshes with an idler gear 29, in turn meshing with a gear 30 fixed to the shaft 27. It will thus be seen that the shaft 27 can be driven from the shaft 20 is opposite directions according to whether the shiftable clutch member 24 is in engagement with the clutch member 22 or the clutch member 23.

Splined on the shaft 27 is a two-step gear cone formed of the gears 31 and 32 which can be selectively meshed with the gears 33 or 34 fixed to a shaft 35. It will be seen that the shaft 35 can thus be driven at either one of two speeds and in opposite directions from the shaft 20.

The gear 34 on the shaft 35 meshes with a gear 36 formed on a sleeve 36a that is freely rotatable on the spindle 19, said sleeve being held against endwise movement on the spindle by a collar 37 and a gear 38 fixed to the spindle. A rear two-step gear cone formed of gears 39 and 40 is splined on a shaft 41 and the gears 39 and 40 can be selectively intermeshed with the gear 36 or with a gear 36b formed on the sleeve 36a. It will be understood that the shaft 41 can be driven at any one of four speeds and in opposite directions.

The shaft 41 also has splined thereon a second or front two-step gear cone formed of the gears 42 and 43. The gear 42 may be intermeshed with the gear 38 fixed to the spindle 19 or the gear 43 may be intermeshed with a gear 44 also fixed to the spindle 19. It will be seen that the work spindle in this instance can be driven in opposite directions from the shaft 20 at any one of eight different speeds. The front two-step gear cone in addition to its two operative positions can be located in an intermediate position at which time the work spindle is disconnected from its drive for purposes of loading or unloading.

The movable clutch member 24 is shifted to either one of its operative positions or to its inoperative or neutral position by means of a fork 45 that engages in the annular groove in the cluch member 24 and which is formed on a sleeve 45a slidably supported on a rod 46 mounted in the head stock. The sleeve 45a that carries the fork 45 is moved endwise on the rod 46 by means of an arm 47 having a rounded end portion fitting in a slot formed in the upper side of the sleeve 45a, said arm 47 being fixed to the lower end of a downwardly projecting shaft 48a that is integral with a cylindrical bearing portion 48b of a member 48.

It will be noted that the bearing portion 48b of the member 48 is rotatably mounted in an opening in the cover 17a of the head stock and said member has pivotally mounted therein on a horizontal axis a control lever 49 that extends from the member 48 toward the front of the head stock through a relatively narrow elongated slot 48c formed in the member 48 and permitting pivotal movement of the lever 49 about its horizontal axis, that is, from the full line position of Fig. 3 to the dash line position thereof.

It will be understood, however, that when the lever 49 is moved in a horizontal plane the member 48 will be rocked about the bearing portion 48b and through the downwardly extending shaft 48a the arm 47 will be rocked and effect a movement of the sleeve 45a and fork 45 to shift the movable clutch member 24 of the clutches.

The two-step gear cone on the shaft 27 is shifted to either one of its operative positions by means of a fork 50 that straddles the large gear 31 of the two-step gear cone and is formed integral with a sleeve 50a slidably mounted on a rod 51, which rod also constitutes the bearing shaft for the idler gear 29. The sleeve 50a is provided with an integral upwardly and laterally extending arm 50b, the end of which is provided with a slot straddling the lower end of a lever 52 that is fixed to one end of a sleeve 52a freely rotatable on a shaft 53 that is rotatably supported in the cover 17a of the head stock.

The sleeve 52a at its end opposite to the end carrying the lever 52 has fixed thereto an upwardly extending arm 52b which is rocked by the selecting or preselecting mechanism in a manner later to be explained, it being understood, however, that such rocking of the arm 52b will, through the sleeve 52a, arm 52, and fork 50, effect a shifting movement of the two-step gear cone on the shaft 27.

The rear two-step gear cone on the shaft 41 is shifted to either one of its two operative positions by means of a lever 54 having its lower end in the form of a fork straddling the gear 40 and which lever is fixed to a sleeve 54a freely rotatably mounted on the shaft 53 and having fixed to its end opposite to the lever 54 an upwardly extending arm 54b similar to the arm 52b previously described. It will be understood that when the sleeve 54a is rocked a shifting movement will be imparted to the rear two-step gear cone.

The front two-step gear cone is shifted by means of a forked lever 55 that straddles the large gear 42 and which is rockably mounted on a bearing pin 55a carried by the cover 17a of the head stock, see Figs. 6 and 9. The forked lever 55 is rocked about its axis by means of a link 56 that is pivotally connected to the lever and to the lower end of a downwardly extending lever 57 that is fixed to the shaft 53. The shaft 53 intermediate the ends of the sleeves 52a and 54a has fixed thereto an upwardly extending arm 58, it being noted that the arm 58 is positioned intermediate the arms 52b and 54b and when said arm 58 is rocked the shaft 53 will be rocked independently of the sleeves and the front two-step gear cone shifted through the lever 57, link 56 and forked lever 55. It will be noted that the arms 52b, 54b and 58 are arranged in close proximity to each other for a purpose later to become clear.

The mechanism for selecting or preselecting the different spindle speeds will now be described. A rectangular frame 59, see Fig. 5, is slidably mounted in the cover 17a of the head stock, the guideways for said frame being formed by the side of the cover and a shoulder formed therein and by a retaining strip 60 underlying the frame, see Figs. 6 and 7. It will be noted that the frame 59 is movable rearwardly and forwardly of the head and the limit of its rearward movement is indicated by the dash line in Fig. 4.

The means for moving the frame 59 includes a rack 59a formed on the underside of one of the side members of the frame and meshing with a gear 61 formed on a rotatable shaft mounted in a bore in the cover, it being understood that the retaining strip 60 is cut away, as indicated in Fig. 8, so that the gear 61 can engage the rack 59a. The gear 61 meshes with an idler gear 62, similarly mounted as is the gear 61, and in turn meshing with a gear 63 formed on the inner end of a shaft 63a, that is rotatably mounted in the cover and carries on its outer end a dial 63b bearing upon its periphery indicia that cooperates with a pointer 63c carried by the cover 17a, see Fig. 6. It will be seen that when the dial 63b is rotated the frame 59 will be moved in its guideway forwardly or rearwardly of the machine, as the case may be.

The periphery of the dial 63b carries nine different indicia, eight of which represent the different spindle speeds and the ninth the neutral position (letter N) when the work spindle is disconnected from its change speed gearing for the purpose of loading or unloading.

The front and rear sides of the frame 59 are provided internally of the frame with grooves 59b (see Fig. 3) lying in a horizontal plane and in which slide a pair of plates 64 and 64a provided on their adjacent edges with a series of long and short projections, short and long projections and a pair of projections of equal length for a purpose later to be explained. The plates 64 and 64a at their edges opposite to the projections are provided on their upper surfaces with grooves or channels 64b formed by spaced parallel upwardly extending portions and these grooves or channels 64b extend transversely to the grooves 59b. Bars 65 are mounted in the parallel grooves 64b and extend rearwardly beyond the rear edge of the frame 59, as viewed in Fig. 5. It will be understood, however, that when the frame 59 is moved rearwardly to the dash line position indicated in Fig. 4 then the bars 65 will extend beyond the front edge of the frame 59.

Equalizing arms 66 have one of their ends pivotally connected to the bars 65 and their opposite ends are pivotally mounted on shouldered bearing pins 66a carried by the cover 17a. The latter ends of the equalizer arms 66 are operatively interconnected by intermeshing gear segments 66b formed thereon. Two equalizing arms 67 have one of their ends pivotally connected to the bars 65 adjacent the rear ends thereof and said arms have their opposite ends pivotally mounted on shouldered bearing pins 67a carried by the cover and are operatively interconnected by intermeshing gear segments 67b formed on said ends.

It will be understood that due to the equalizing arms 66 and 67 an equalized parallel movement is obtained of the bars 65 toward and from each other and the bars will always retain their parallel relationship. This equalized movement of the bars 65 in turn will cause an equalized sliding movement of the plates 64 and 64a toward and from each other and such movement of the plates can take place in any of the positions to which the frame 59 has been moved or indexed by the turning of the dial 63b.

It will be understood that the frame 59 carrying the plates 64 and 64a can be moved by the dial 63b transversely of the machine to any predetermined position, inasmuch as the bars 65 during such movement slide in the grooves 64b of the plates.

One end of a link 68 is pivotally connected to one of the arms 67, while the opposite end of said link is pivotally connected to an arm 69 formed integral with a sleeve 69a that is rockably mounted on a downwardly extending shouldered bearing pin 69b carried by the cover 17a. The lower end of the sleeve 69a is provided with an integral arm 69c, the outer end of which is forked as indicated at 69d and straddles a double flanged bushing 70 that is freely slidable in the forked portion.

The cylindrical member 49a mounted in the member 48 and constituting the horizontal axis of the control lever 49 is provided with a downwardly extending lever 71 that has a spherical lower end arranged in the bore of the bushing 70. It will be seen that when the control lever 49 is raised or lowered a rocking movement will be imparted to the sleeve 69a and the arm 69, and, in turn, through the link 68 and equalizing member 67 an equalized movement will take place of the bars 65 and plates 64 and 64a toward or from each other as the case might be.

It will be noticed by reference to Fig. 10 that the axis of the lever 71 lies substantially in the axis of the bearing portion 48b and shaft 48a of the member 48, wherefore when rotative movements are imparted to the member 48 by horizontal movement of the control lever 49, substantially no movement will be given to the sleeve 69a and in turn to the bars 65 and plates 64 and 64a. Any movements which might be thus transmitted to the bars and plates are so slight as to be taken care of by the clearance distances provided between the adjacent ends of the projections on the plates and the arms 52b, 54b and 58 when the plates are in their most outward position.

It will be understood that the series of long and short projections, and short and long projections on the adjacent edges of the plates 64 and 64a are for the purpose of engaging and moving the arms 52b, 54b and 58 when the plates are moved to their most inward position to effect a selective movement of the arms and, in turn, a shifting of one or more of the gear cones to their different operative positions.

It will also be noted that the adjacent edges of the plates are provided with a pair of projections of equal length, as indicated at 64c, see Fig. 4, which projections in a certain indexed position of the plates cooperate when the plates are moved to their most inward position to move the arm 58 to a position such that the front two-step gear cone is disconnected from the gears on the spindle to allow the spindle to be manually rotated for the purpose of unloading or loading (see full line position of front two-step gear cone in Fig. 6).

It will thus be understood that since the spindle in the particular machine illustrated herein has eight operative speeds, there are nine groups of projections on the plates 64 and 64a, with each group of projections shifting the three arms 52b, 54b and 58 to nine different positions, eight of which positions occur for the eight different speeds of the spindle, while the ninth position is a neutral one wherein the front two-step gear cone is disengaged from the spindle, as shown in Fig. 6. Therefore, the dial 63b will be provided on its periphery with numbers representing the eight different spindle speeds and with the letter "N" representing the neutral position as has been previously explained.

Assuming that the machine is operating in the next to the last step of an operative cycle, the control lever 49 will be in its upper or dotted line position as viewed in Fig. 3, at which time the plates 64 and 64a are in their most outward position. It will also be understood, of course, that the horizontal position of the lever 49 is such that the main driving clutch is engaged. The operator while the machine is operating can turn the dial 63b to bring the number representing the spindle speed for the final step of the work cycle into line with the pointer 63c and this turning of the dial 63b linearly moves the frame 59 to index or position the plates 64 and 64a with respect to the arms 52b, 54b and 58. Then when this next to the last step of the operative cycle is completed the operator first moves the control lever horizontally to disengage the main driving clutch and then continues movement of the lever in a downward direction to effect an inward equalized movement of the plates 64 and 64a, so that the projections which have been positioned by the indexing movement of the plates will move one or more of the arms 52b, 54b and 58 to shift the gear cones to change the gear ratio in the drive to the spindle. When this has been done the operator again moves the control lever horizontally to engage the main driving clutch and then raises said lever vertically to effect an outward movement of the plates 64 and 64a, so that they are out of engagement with the arms and can be indexed.

During the operation of the machine in the final operative step of the cycle the operator turns the dial 63b to bring the letter "N" into line with the pointer, and this, of course, indexes the plates 64 and 64a to the position shown in Fig. 4, where the pair of projections of equal length are in line with the arm 58. Upon the completion of the last operative step the operator first moves the control lever horizontally to disengage the main clutch, and then downwardly to move the plates 64 and 64a inwardly so that the arm 58 will be moved to a position resulting in the front two-step gear cone being disconnected from the spindle, after which he moves the lever upwardly to position the plates for indexing. It will be understood that this inward movement of the plates to obtain the neutral position might, in this instance, also cause a shifting of the other gear cones in the drive, but it is immaterial if such is the case, since the spindle then is disconnected from its drive and the machine is being unloaded and loaded.

When a new work piece has been mounted on the spindle and a new operative cycle is to be initiated, the operator turns the dial to the spindle speed required for the first step in the work cycle, then moves the lever downwardly to bring the plates in to shift the gear cones to obtain said speed, and then horizontally to engage the main driving clutch and then upwardly to move the plates to their outer position for indexing. It will be understood that once the machine is operating in the first step of the work cycle the spindle speeds for the other steps in the work cycle can be preselected in the manner hereinbefore explained with respect to the last two steps of the previous cycle. It will also be understood that, if desired, the spindle speeds may be selected as distinguished from preselected merely by the operator first disengaging the main driving clutch at the end of each step of the cycle and then turning the dial to select the spindle speed for the next step, after which the control lever is moved vertically downward to obtain said speed and then upwardly to move the plates outwardly, after which the main driving clutch is reengaged. It will also be understood that suitable spring points are provided to hold the parts in their indexed, shifted or moved positions wherever necessary, but since the same are well known they are not shown herein.

It will be appreciated that when the mechanism is employed for selecting as distinguished from preselecting, and difficulty in meshing the gears is encountered, the operator may move the control lever horizontally to momentarily engage the main clutch to impart coasting movement to the gears and thus facilitate their intermeshing.

Although the selecting or preselecting mechanism has been shown and described in connection with a machine having eight different spindle speeds it will be understood that said mechanism could readily be adapted for machines having a greater or lesser number of spindle speeds. It will also be understood that the mechanism could be employed with the change speed drive for other movable parts of the machine, such as the feed drives for the turret slide, cross slide carriage, or cross slide.

Although a preferred embodiment of the invention has been illustrated and described herein, it will be understood that various changes and adaptations may be made therein within the scope of the appended claims.

Having thus described my invention I claim:

1. In a machine tool having a part to be moved at different speeds, driving means for moving said part, speed changing means for said part including a pair of devices having on their adjacent edges aligned cooperating portions for actuating said speed changing means to obtain any one of the different speeds for said part, and means for moving said devices linearly in one direction to select said speeds and linearly in another direction to obtain said speeds.

2. In a machine tool having a part to be moved at different speeds, driving means for moving said part, speed changing means for said part including a pair of devices having on their adjacent edges aligned cooperating portions for actuating said speed changing means to obtain any one of the different speeds for said part, and means for moving said devices in a plane in one direction to select said speeds and in the same plane in another direction to obtain the selected speeds.

3. In a machine tool having a part to be moved at different speeds, driving means for moving said part, speed changing means for said part including a pair of plates provided with a plurality of aligned cooperating means on their adjacent edges for actuating said speed changing means to obtain any of the speeds for said part, said plates being movable linearly in one direction to select said speeds and linearly in another direction to obtain said speeds.

4. In a machine tool having a part to be moved at different speeds, driving means for moving said part, speed changing means for said part including a pair of plates provided with a plurality of aligned cooperating means on their adjacent edges for actuating said speed changing means to obtain any of the speeds for said part, said plates being movable endwise to select said speeds and movable toward each other to obtain said selected speeds.

5. In a machine tool having a part to be moved at different speeds, driving means for moving said part, speed changing means for said part including a pair of elongated plates arranged in the same plane and provided on their adjacent edges with aligned cooperating portions for actuating said speed changing means to obtain any of the speeds for said part, said plates being movable linearly endwise to select said speeds and linearly toward each other to obtain the selected speeds.

6. In a machine tool having a part to be moved at different speeds, driving means for moving said part, speed changing means for said part including a slidable frame, a pair of plates slidably mounted on said frame for movement toward and from each other and provided with a plurality of means for actuating said speed changing means to obtain any of the speeds for said part, means for moving said frame and plates as a unit to select said speeds, and means for moving said plates relative to said frame to obtain the selected speeds.

7. In a machine tool having a part to be moved at different speeds, driving means for moving said part, speed changing means for said part including a pair of elongated plates having on their adjacent edges aligned cooperating portions for actuating said speed changing means to obtain any of the speeds for said part, and means for moving said plates endwise to select said speeds and for imparting an equalized movement to said plates toward each other to obtain the selected speeds.

8. In a machine tool having a part to be moved at different speeds, driving means for moving said part, speed changing means for said part including a slidable frame, a pair of plates slidably mounted on said frame for movement toward and from each other and provided with a plurality of means for actuating said speed changing means to obtain any of the speeds for said part, means for moving said frame and plates as a unit to select said speeds, and means for imparting equalized movement to said plates relative to said frame and toward each other to obtain the selected speeds.

9. In a machine tool having a part to be moved at different speeds, driving means for moving said part, speed changing means for said part including a pair of plates movable in a plane toward and from each other and provided on their adjacent edges with a plurality of cooperating projections for actuating said speed changing means to obtain any of the speeds for said part, means for shifting said plates endwise to select said speeds, and means for moving said plates toward each other to obtain the selected speeds.

10. In a machine tool having a part to be moved at different speeds, driving means for moving said part, speed changing means for said part including a linearly shiftable frame and a pair of plates carried by said frame and having relative movement thereon transverse to the shifting movement thereof, a control member for shifting said frame to select the speeds for said part, and a second control member for moving said plates relative to said frame to actuate said speed changing means to obtain the selected speeds.

11. In a machine tool having a part to be moved at different speeds, driving means for moving said part, speed changing means for said part including a pair of plates having cooperating means for actuating said speed changing means to obtain any of the speeds for said part, said plates being movable linearly in one direction to select said speeds and linearly in another direction to obtain the selected speeds, and a single control member for controlling the latter movement of said plates and for controlling said driving means.

12. In a machine tool having a part to be moved at different speeds, driving means for moving said part, speed changing means for said part and including a pair of plates movable endwise to select any of the speeds for said part and movable toward and from each other to obtain the selected speeds, said plates being provided with longitudinally extending grooves, bars slidably mounted therein, and means for imparting an equalized parallel movement to said bars and plates toward and from each other and including pivoted levers having one of their ends connected to said bars and their opposite ends provided with cooperating equalized movement transmitting portions.

13. In a machine tool having a part to be moved at different speeds, driving means for moving said part, speed changing means for said part and including a frame movable linearly in one direction, a pair of plates carried by said frame and movable relative thereto toward and from each other, said plates being provided with longitudinally extending grooves, bars slidably mounted in said grooves, means for imparting an equalized parallel movement to said bars and plates relative to said frame toward and from each other and including pivoted levers having one of their ends pivotally connected to said bars and their other ends provided with cooperating equalized movement transmitting portions, and means for moving said frame and plates linearly and causing a relative sliding movement between said bars and said plates.

14. In a machine tool having a part to be moved at different speeds, driving means for moving said part, speed changing means for said part including a pair of plates arranged in the same plane and movable toward and from each other and provided on their adjacent edges with a plurality of cooperating projections, actuating members for shifting said change speed means and having portions located between said projections and lying substantially in the plane of said plates, means for moving said plates in one direction to selectively position said projections with respect to said actuating members, and means for moving said plates toward each other to cause said projections to engage said members and effect a shifting of the change speed means.

15. In a machine tool having a part to be moved at different speeds, driving means for moving said part, speed changing means for said part including a pair of plates arranged in the same plane and movable toward and from each other and provided on their adjacent sides with a plurality of cooperating projections, rockable actuating members for shifting said change speed means and mounted on a common axis and having portions located between said projections and lying substantially in the plane of said plates, means for moving said plates in one direction to selectively position said projections with respect to said actuating members, and means for moving said plates toward each other to cause said projections to engage said members and effect a shifting of the change speed means.

16. In a machine tool having a part to be moved at different speeds, driving means for moving said part, speed changing means for said part including a plurality of shifter members and a pair of devices having cooperating means for actuating said shifter members to obtain any one of the different speeds for said part, and means for moving said devices linearly in one direction and relative to said shifter members to select said speeds and linearly in another direction to actuate said shifter members to obtain such speeds.

17. In a machine tool having a part to be moved at different speeds, driving means for moving said part, speed changing means for said part including a plurality of shifter members having operating portions located in a given plane and a pair of devices having cooperating means for actuating said shifter members to obtain any one of the different speeds for said part, and means for moving said devices in said plane in one direction and relative to said shifter members to select said speeds and in another direction in the same plane to actuate said shifter members for obtaining the selected speeds.

18. In a machine tool having a part to be moved at different speeds, driving means for moving said part, speed changing means for said part including a pair of plates movable toward and from each other and provided on their adjacent sides with a plurality of cooperating projections, a plurality of coaxially disposed shafts, levers carried by the shafts and having portions located between said projections, means for moving said plates in one direction to selectively position said projections with respect to said lever portions, and means for moving said plates toward each other to cause said projections to engage said lever portions and effect a shifting of the speed change means.

19. In a machine tool, the combination of a head having change speed gearing therein, an assembly unit comprising a cover for said head having a recess therein and mechanism in said cover for shifting said change speed gearing, said mechanism comprising independently operable coaxially disposed shafts having means cooperating with the gearing for shifting the same, shifter members connected with the shafts and extending into the cover recess, and means in the cover movable in one direction relative to said shifter members for selecting the speed change desired and movable in another direction to actuate one or more of said members to obtain the desired speed or speeds.

MAX E. LANGE.